United States Patent [19]
Wong

[11] Patent Number: 5,652,854
[45] Date of Patent: Jul. 29, 1997

[54] METHOD AND APPARATUS FOR MAPPING PAGE TABLE TREES INTO VIRTUAL ADDRESS SPACE FOR ADDRESS TRANSLATION

[75] Inventor: Hung Ping Wong, New York, N.Y.

[73] Assignee: Novell, Inc., Provo, Utah

[21] Appl. No.: 469,376

[22] Filed: Jun. 6, 1995

Related U.S. Application Data

[63] Continuation of Ser. No. 306,247, Sep. 14, 1994, abandoned, which is a continuation of Ser. No. 814,854, Dec. 30, 1991, abandoned.

[51] Int. Cl.$^6$ ................................................ G06F 12/10
[52] U.S. Cl. ......................... 395/416; 395/418; 395/419
[58] Field of Search .................................... 395/418, 416, 395/419

[56] References Cited

U.S. PATENT DOCUMENTS

| | | | |
|---|---|---|---|
| 4,385,352 | 5/1983 | Bienvenu | 395/418 |
| 4,758,946 | 7/1988 | Shar et al. | 395/416 |
| 5,095,420 | 3/1992 | Eilert et al. | 395/419 |
| 5,313,611 | 5/1994 | Franklin et al. | 395/416 |

OTHER PUBLICATIONS

"Fundamental Algorithms", Knuth, Donald E., Sec. 2.3.3, Addison–Wesley, 1968, pp. 347–354.

Primary Examiner—Matthew M. Kim
Assistant Examiner—Reginald G. Bragdon
Attorney, Agent, or Firm—Computer Law++

[57] ABSTRACT

Techniques used in a virtual memory system for mapping the page table for a process onto the process's virtual address space. The mappings make it possible for the virtual memory manager to compute addresses for the page table in the same fashion, regardless of the page table configuration required by the hardware. The techniques include linear mapping of a process's page table entries onto a portion of its virtual address space and self-recursive mapping of page trees onto the virtual address space. The techniques make porting an operating system to various kinds of hardware easier, reduce the size of the portion of virtual memory which must be reserved for the page table, and speed up references to the page table by the virtual memory manager. Further refinements permit creation of nodes of the mapped page table on demand and access of a second process's page table from a first process's page table.

25 Claims, 4 Drawing Sheets

METHOD AND APPARATUS FOR MAPPING PAGE TABLE TREES INTO VIRTUAL ADDRESS SPACE FOR ADDRESS TRANSLATION

This application is a continuation of application Ser. No. 08/306,247, filed Sep. 14, 1994, now abandoned, which is a continuation of application Ser. No. 07/814,854, filed Dec. 30, 1991, now abandoned.

BACKGROUND OF THE INVENTION

1. Field of the Invention

The invention concerns virtual memory systems generally and particularly concerns techniques which make it easier to port an operating system which creates a virtual memory to different hardware environments.

2. Description of the Prior Art

Modern operating systems are generally multi-process virtual memory systems. Such operating systems create processes to execute programs. The operating system further creates a virtual address space for each process. Programs executed by the process specify data by means of virtual addresses. A virtual address specifies the location of the data in the process's virtual address space.

Of course, the operating system is executed on a physical computer system which has a physical memory system. The physical memory system is addressable by physical addresses. The operating system creates the virtual address space for a process by mapping those parts of the virtual address space to which virtual addresses currently employed by the process belong into portions of the physical memory system and then translating the virtual addresses into physical addresses specifying the data. The mapping is done in a data structure termed the page table. Modern computer systems often include a hardware component, the memory management unit, which employs information from the page table to accelerate the translation of virtual addresses into physical addresses.

Operating systems are generally adapted to run on a variety of different hardware systems. The operation of adapting an operating system to run on a different hardware system is termed porting the operating system to the hardware system. A goal of operating system designers is to reduce porting effort to a minimum. One area of the operating system which has always required substantial porting effort is the translation of virtual addresses to physical addresses. One reason why substantial effort has been required in this area is that the memory management unit of a given hardware system requires a specific form of page table. Since the page table is also used by the operating system, all of those components of the operating system which use the page table must be rewritten as required for the specific form of the page table. It is an object of the present invention to provide techniques which reduce the porting effort and otherwise reduce the cost of dealing with page tables.

Virtual Memory System Overview: FIGS. 1–3

FIG. 1 shows one of the processes created by the operating system and the virtual address space belonging to the process. Process (PROC) 107 has virtual address space (VAS) 101. To access data 105 in virtual address space 101, process 107 employs virtual address (VA) 109. Virtual address space 101 is subdivided into a number of virtual pages (VP) 103. Each virtual page 103 has a virtual page number (VPN) 104. A virtual address 109 consists of two parts: virtual page number 104 specifying the virtual page 103 which contains the data 105 and offset (OFF) 108 which specifies the offset of the data 105 from the beginning of the virtual page. Thus, if data 105 has offset 1024 in page 0, its virtual address is 01024.

Continuing with FIG. 2, that figure shows a hardware system 201 in which an operating system creates processes 107 and virtual address spaces 101. The main components of hardware system 201 are main processor (MP) 203, memory (MEM) 213, data store (DS) 217, and auxiliary processor (AP) 205. Auxiliary processor 205, memory 213, and main processor 203 are connected by bus 207.

Memory 213 is subdivided into physical pages (PP) 215. Each physical page has a physical page number 225, and data is referenced in memory 213 by means of a physical address 223 containing a physical page number 225 and the offset 108 of the data in the physical page. Virtual pages 103 are sized such that they are the same size as physical page 215 in memory 213. Consequently, a virtual address may be convened to a physical address by converting virtual page number 104 to physical page number 225 for the physical page 215 which contains data 105 and adding offset 108 from the virtual address to the physical page number.

Data store 217 is a mass storage device such as a disk drive which contains data 105 for a process 107 when process 107 is not actually referencing data 105. Data 105 is stored in a darn store page 219 which is the same size as virtual page 103 and physical page 215. Auxiliary processor 205 moves copies of data store pages 219 from data store 217 to physical pages 215 and moves copies of physical pages 215 in which data has been modified from memory 213 to data store pages 219.

Main processor 203 has two components which are of interest here: instruction execution unit 209, which executes instructions from a program in memory 213, and memory management unit 211. When an instruction specifies a virtual address 109, instruction execution unit 209 provides the virtual address 109 to memory management unit 211, which attempts to translate the virtual address 109 into the physical address of data 105 in memory 213. In so doing, it uses information in the page table. If data 105 is in memory 213, the translation succeeds, and memory management unit 211 provides physical address 223 to memory 213, which then accesses data 105.

If data 105 is not in memory 213, then a page fault results. The operating system responds to the page fault by determining which data store page 219 in data store 217 corresponds to virtual page 103 which contains data 105, copying that data store page 219 into a physical page 215, and updating the page table so that virtual page 103(x) specified in the virtual address 109 for the data is related to physical page 215(y) which to which the data store page 219 was copied. Once the page table has been updated, the memory management unit 211 again attempts the translation, which now succeeds.

FIG. 3 shows details of the page table and the relationship between the page table, virtual address space 101, the operating system, and memory management unit 211. Page table 311 is a data structure which contains page table entries 313. Each page table entry 313 relates a virtual page number 104 to the physical page number 225 for the physical page 215 which currently contains data whose addresses contain virtual page number 104. Page table entries 313 are referred to by memory management unit 211; they are also referred to by virtual memory manager 319. Virtual memory manager 319 is a program which is a component of the operating system. Virtual memory manager 319 responds to a page fault by copying data store page 219 corresponding to the referenced virtual page 103 into a physical page 215. In the course of doing this, virtual memory manager 319 updates page table 311 so that there is a page table entry relating the referenced virtual page to the physical page which contains the copy of data store to page 219.

Memory management unit 211 can only provide physical addresses 223 to memory 213; consequently, it must be able to reference page table 311 by means of physical addresses; virtual memory manager 319, on the other hand, is an operating system program, and as such, it uses virtual addresses; consequently, page table 311 must be located in an area of virtual memory where virtual addresses are the same as physical addresses. That area is of course the region of virtual address space 101 which begins at virtual address 0 (301 in FIG. 3) and extends to the virtual address which is the same as the maximum physical address 223, shown as 305. This portion of virtual address space 101 is reserved virtual address space (RVAS) 309, and is not available for addressing data other than page table 311.

Problems of Page Table 311: FIG. 4

An important consequence of the fact that page table 311 is referenced by memory management unit 211 is that memory management unit 211 dictates the form of page table 311, and that page table 311 is therefore a hardware-specific data, structure. FIG. 4 shows two possible versions of page table 311. Page table 311(a) is a page table array (PTA) 401. There are as many entries 403 in page table array 401 as there am virtual pages 103 in virtual address space 101. Each entry corresponds to one of the virtual pages and contains the physical page number 225 of physical page 215 corresponding to the virtual page, if such a physical page 215 currently exists.

Page table 311 (b) is a page table tree (PTT) 405. Page table tree 405 consists of a number of nodes 414. At the root of the page table tree is segment table node 407. Segment table node (STN) 407 specifies a set of segments of virtual address space 101. Each segment consists of a set of contiguous virtual pages. Segment table node 407 contains a segment table entry 409 for each segment. Each entry 409 contains the physical ass (shown by arrow 415) of a page table node 411 which contains page table entries 413 for the virtual pages 103 in the segment. Each page table entry 413 relates a virtual page number 104 to the physical page number 225 for the physical page (if any) which currently contains data addressed by virtual addresses 109 containing the virtual page number 104. Page table tree 405 is a two-level tree; level one 417 contains segment table node 407, while level 2 419 contains page table nodes 411. Page table nodes 411 are leaf nodes of page table tree 405. Page table trees 405 for other memory management units 211 may have more levels; the highest level always contains the leaf nodes with page table entries 413.

As can be seen by comparison of page table 311(a) with page table 311(b), the code in virtual memory manager 319 which manages page table array 401 will necessarily be different from the code in virtual memory manager 319 which manages page table tree 405; consequently, when the operating system is ported from a hardware system whose memory management unit 211 requires a page table array 401 to one which requires a page table tree 405, that portion of the code of virtual memory manager 319 must be rewritten. Similar rewrites are necessary to port the operating system from hardware which requires a two-level page table tree 405 to hardware which requires a page table tree 405 with more levels.

The arrangement shown in FIGS. 3 and 4 has additional problems. First, since page table 311 may be anywhere in memory 213, reserved virtual address space 309 must be as large as physical memory 213. In the past, physical memory 213 always had an address space which was much smaller than virtual address 101, so this requirement was not a problem. However, as memory has grown cheaper, physical memory has grown larger, so that reserved virtual address space 309 has become an ever more significant portion of virtual address space 101.

Second, page tables 311 are tending more and more to be implemented as page table trees 405 of three and more levels. There are two reasons for this. One, virtual addresses are getting longer, and consequently, the virtual address space 101 is getting larger. In the not-too-distant future, many hardware systems will employ 64-bit virtual addresses. Two, efficient use of memory 213 requires that physical pages 215 be relatively small. Since the size of the physical pages 215 determines the size of the virtual pages 103, the result of these two developments is that virtual address space 101 will contain ever more virtual pages 103. As the number of virtual pages increase, linear data structures like page table array 401 become more expensive and page table trees 405 acquire more and more levels. However, the more levels a page table tree 405 has, the slower and more complex the maintenance operations performed by virtual memory manager 319 become. For example, in a three-level tree, three memory references are required to locate a page table entry 413: one to locate segment table node 407, one to locate a second-level node, and one to locate the leaf node containing the page table entry 413.

SUMMARY OF THE INVENTION

In one aspect, the invention is an address translation apparatus for translating virtual addresses specifying locations in a virtual address space into physical addresses specifying corresponding locations in a physical memory. The apparatus includes a memory management unit for receiving a given virtual address and responding thereto by providing a physical address specifying the corresponding location in physical memory;

an address translation data structure which contains address translation information used by the memory management unit, which the memory management unit accesses by means of the physical addresses, and which has characteristics which are specific to the memory management unit; and maintenance means which maintains the address translation data structure and which accesses the address translation structure by means of the virtual addresses.

The apparatus is characterized in that the address translation data structure is mapped into the virtual address space such that the type of address calculations performed by the maintenance means to access the address translation structure is not dependent on those characteristics of the address translation structure which are specific to the memory management unit.

Other aspects of the invention include the use of linear mapping and self-recursive linear mapping to map the address translation data structure into the virtual address space. Additional aspects include new techniques for mapping a tree of nodes into a virtual address space and for mapping a page table tree into a virtual address space.

These and other objects, aspects, and advantages of the techniques disclosed herein will be apparent to those of ordinary skill in the art after study of the appended Detailed Description and Drawings, wherein:

Figure 3:
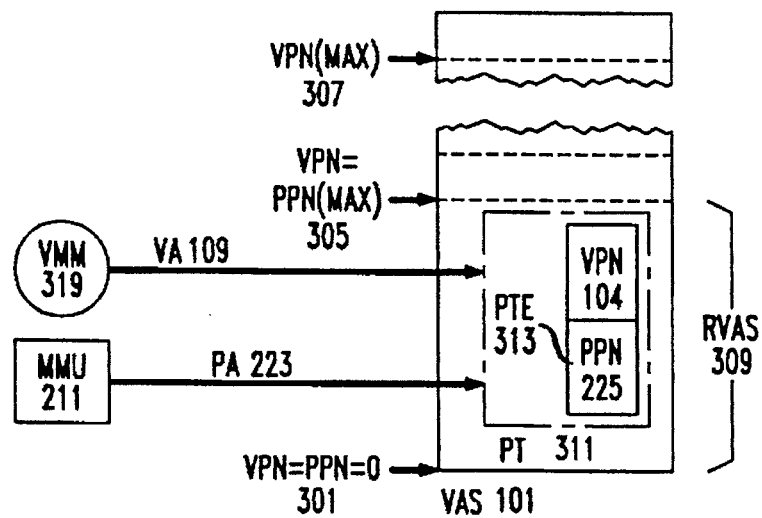
FIG. 3 is a detailed diagram of a virtual address space of the prior art.
Figure 4:
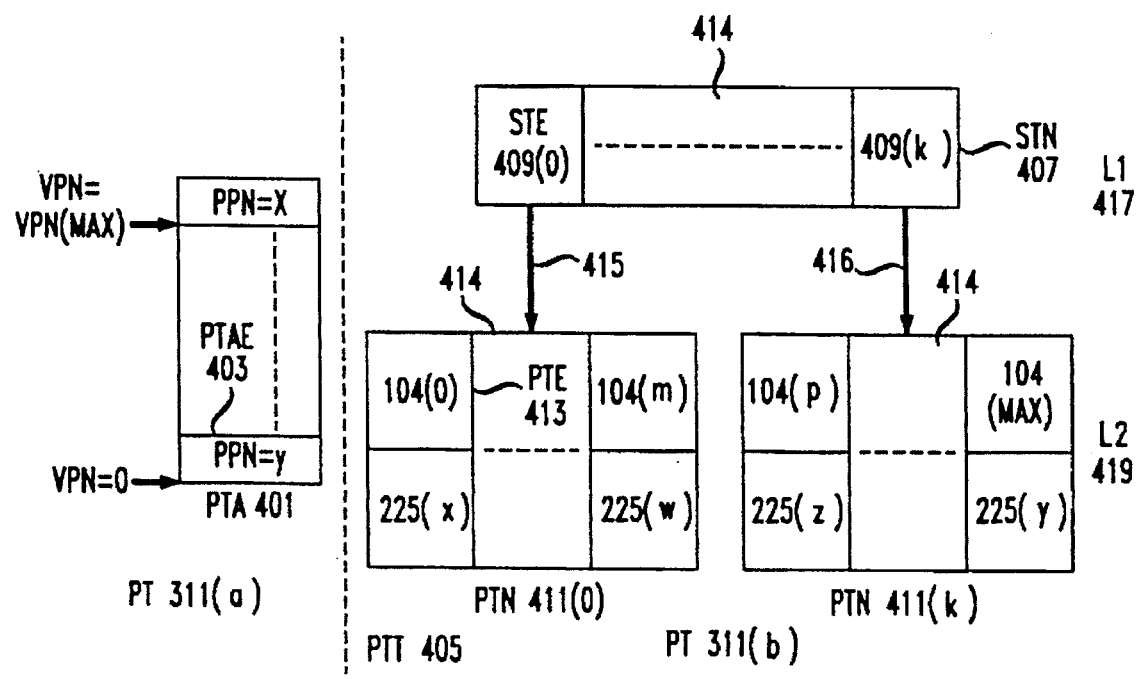
FIG. 4 is a diagram of two types of page tables of the prior art.

Reference numbers used in the Figures and the Detailed Description have two parts. The two least-significant digits are reference numbers within a figure; the remaining digits are the figure number. Thus, reference number 305 refers to an item which first appears in FIG. 3.

DETAILED DESCRIPTION

Linear Mapping of Page Tables into the Virtual Address Space: FIGS. 5–8

The virtual address translation apparatus and methods disclosed herein solve the foregoing problems. The apparatus and methods are based on the insight that if the page tables 311 required by various kinds of hardware can be mapped into an area of process 107's virtual address space 101 such that the mapped area has the same characteristics regardless of the kind of page table 311, then virtual memory manager 319 will not require extensive modifications when the operating system is ported from one hardware system to another. Moreover, only the part of virtual address space 101 need be reserved which is actually required for the mapped area. Finally, if the mapped area has the right characteristics, it will become much easier for virtual memory manager 319 to locate page table entries 313, and the overhead involved in managing page table 311 will be reduced.

In a preferred embodiment, page table 311 is mapped into an area of virtual address space 101 in a fashion such that the virtual address of the page table entry 313 for a given virtual page 103 can be computed directly from the virtual page 103's virtual page number 104. The technique employed to do this in the preferred embodiment is linear mapping. When a page table 311 is linearly mapped into virtual address space 101, the page table entries 313 of the page table are ordered in the virtual address space by virtual page number. Consequently, the virtual address 109 of a page table entry 313 for a given virtual page 103 may be calculated by multiplying the virtual page's virtual page number 104 by the size of a page table entry 313 and adding the result to a beginning point which marks the beginning of the sequence of page table entries 313.

Figure 5:
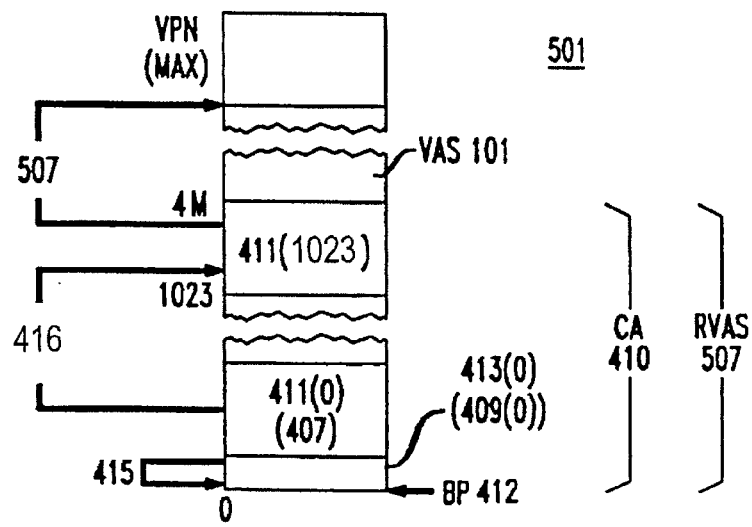
FIG. 5 is a diagram of a mapping of a two-level page table tree onto a virtual address space.

FIG. 5 shows one such linear mapping 501 for a two-level page table tree similar to page table tree 405. In the two-level page table tree, each node 414 occupies its own 4K byte virtual page 103 and each node 414 has 1024 entries. In segment table node 407, the entries contain the physical addresses 415 of the physical pages 215 corresponding to the virtual pages containing page table nodes 411; in page table nodes 419, the entries contain the physical addresses 225 of the physical pages corresponding to the virtual pages whose virtual page numbers 104 are specified in the entries.

The mapping is as follows: the nodes 414 of page table tree 405 are mapped onto virtual address space 101 a level at a time, the nodes of each level being mapped in the order in which they occur in the level and each mapping beginning with the same virtual page. Thus, in mapping 501, segment table node 407 and page table node 411(0) are both mapped to virtual page 103(0). Then page table nodes 411(1) through 411(1023) are mapped to virtual pages 103(1) through (1023), forming contiguous area 410 of virtual address space 101. This kind of linear mapping is termed self-recursive mapping. Self-recursive mapping is possible because page table node 411(0) contains page table entries 413 for virtual pages 103(0 through 1023), which are exactly the virtual pages pointed to by the segment table entries 409; consequently, the contents of virtual page 103(0) can function both as the first leaf node 411 (0) and as segment table node 407. That being the case, the first page table entry in virtual page 103(0) is simultaneously the first segment table entry 409(0) of segment table node 407 and the first page table entry 413(0) of page table node 411(0). The physical address contained in that page table entry is thus simultaneously address 415 pointing to page table node 411(0) and the address of segment table node 407. Arrow 416 represents the address in page table entry 413(1024) of virtual page 103(0), which points to page table node 411(1024). Address 507, finally, is contained in page table entry 412(1023) of virtual page 103(1023), which contains page table node 411(1023), which in turn contains a page table entry with the address 507 of any physical page corresponding to the virtual page 103 having the maximum virtual page number.

In FIG. 5, contiguous area 410 begins at virtual address 0; however, that is not necessary. All that is required is that the area begin at a known virtual address, that it be contiguous, and that the page table nodes 411 be mapped by order of the virtual page numbers for which they have page table entries. Note that there is no longer any requirement that contiguous area be in the part of virtual address space 101 for which physical addresses and virtual addresses are identical.

In mapping 501, the entire page table tree 405 is mapped into 1024 4K byte virtual pages 103 and contiguous area 410 is contiguous with segment table node 407; consequently, reserved virtual address space 507 is only the low 4M of virtual address space 101. Further, the mapping is linear. Each page table entry 413 is four bytes (4K bytes divided by 1024 entries) and the entries 413 are arranged by order of virtual page number 104 in contiguous address space 410. Because this is the case, a page table entry 413 for a given virtual page 103 can be located by simply multiplying the virtual page 103's virtual page number 104 by 4. Virtual memory manager 319 can consequently directly locate page table entry 413, without first having to reference segment table 407 to find physical address 505 and then using address 505 to reference the proper page table node 411.

Of course, the linear mapping need not be self-recursive. In such a case, only the leaf nodes 411 need be mapped into contiguous area 410. The address computation would be as before, except that beginning point 412 would mark leaf node 411(0). Further, If beginning point 412 is not at the beginning of virtual page 0, the only change in the computation is that the address of beginning point 412 is added to the value obtained by multiplying virtual page number 104 by 4.

In FIG. 5, page table tree 405 is mapped into contiguous area 410; however, if page table array 401 is mapped into area 410, virtual memory manager 319 can compute virtual addresses of page table array entries 403 in array 401 in the same fashion as it computes virtual addresses of page table entries 413 in page table nodes 411; all that needs to be changed are parameters for beginning point 412 and the size of page table array entries 403. Consequently, substantially the same code in virtual memory manager 319 can be used in a port to hardware whose memory management unit 211 requires a page table army 401 and in a port to hardware whose memory management unit 211 requires a page table tree 405.

Figure 6:
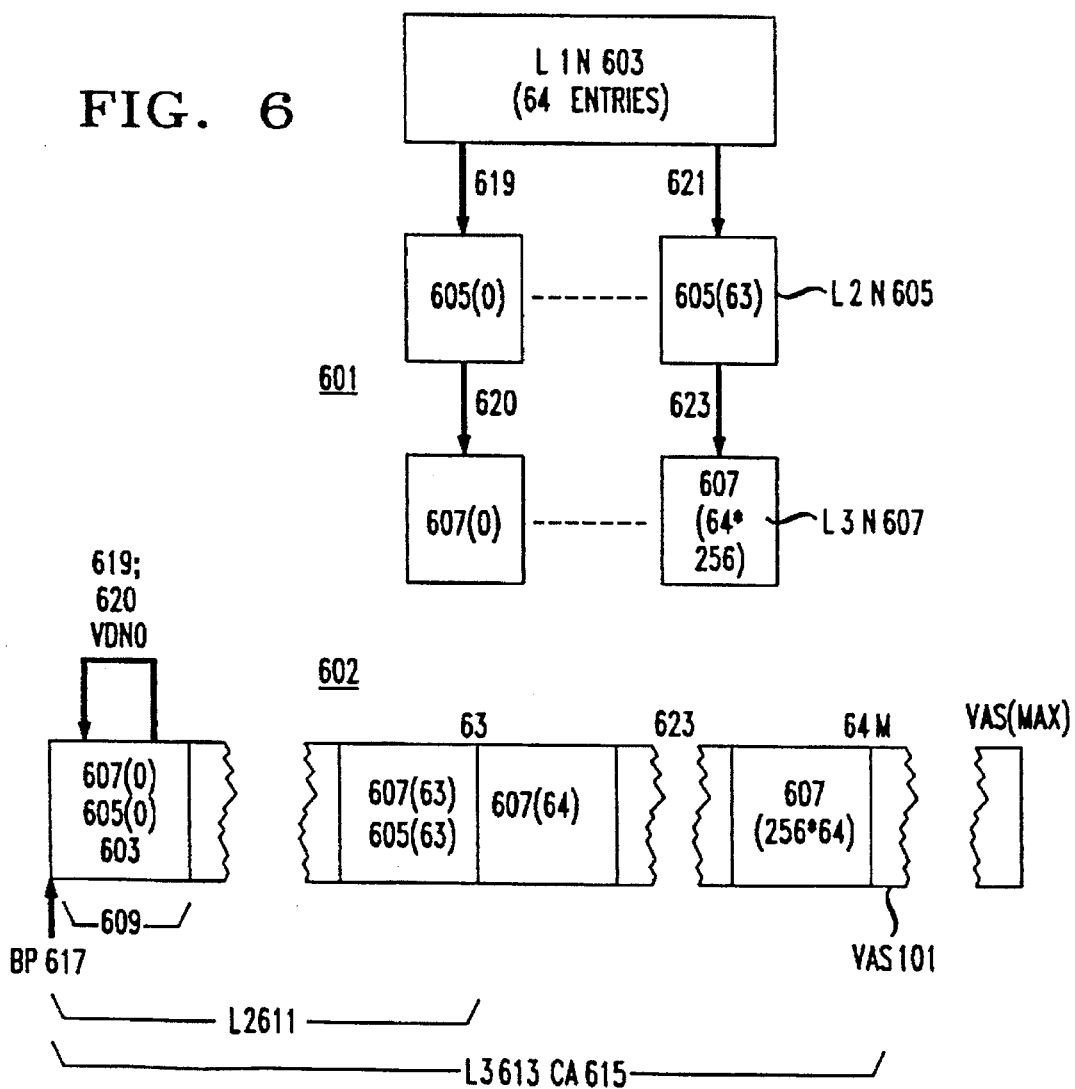
FIG. 6 is a diagram of a mapping of a three-level page table tree onto a virtual address space.

FIG. 6 shows a linear self-recursive mapping of a three-level page table tree 601. Such three-level page table trees 601 are employed in virtual memory systems where virtual page 103 is less than 4K bytes. In three-level page tree 601, there is a level one node (LIB 603 which has 64 entries; each of these entries may contain the address of a level 2 node 605; each of the level 2 nodes 605 has 256 entries, and each of the 256 entries may contain the address of a level 3 node (L3N) 607 (for example, pointer 623). The level 3 nodes 607 are the leaf nodes and contain page table entries for the virtual pages. Each of nodes 607 contains 256 page table entries and the nodes 607 are arranged in order of virtual page number. Thus, node 607(0) contains the page table entries for virtual pages 0–255, node 607(1) for virtual pages 256–511, and so on through node 607(256*64).

Mapping 602 shows the linear self-recursive mapping. Thus, the mapping of all three levels begins at virtual page 103(0). Accordingly, level 1 node 603, level 2 node 605(0), and level 3 node 607(0) are all mapped onto virtual page 103(0). Level 2 nodes 605 (1–63) and level 3 nodes 607 (1–63) are mapped onto virtual pages 103(1–63); level 3 nodes 607(64 to (64*256)) are mapped onto virtual pages 103 (64 to (64*256).

The triple mapping of virtual page 103(0) and the double mapping of virtual pages 607(1–63) is again possible because the page table entries in virtual pages 103(0–63) contain the physical addresses of physical pages 215 which are also nodes of tree 601, and the addresses can therefore simultaneously function as pointers to nodes of tree 601 and as addresses of physical pages corresponding to the virtual pages. The effect of the self-recursive mapping is shown in FIG. 6 with regard to page table entry 0 in virtual page 0. That entry is simultaneously entry 0 in root node 603, entry 0 in second-level node 605(0), and entry 0 in third-level node 605(0), and the address in that entry thus corresponds to addresses 619 and 620 of tree 601 as well as the address of root node 603. The address is of course that of virtual page 0.

The leaf nodes of tree 601, the level 3 nodes 607, are all mapped onto virtual pages 0 through (256*64); for that reason, it is again possible to compute the virtual address of a page table entry for a given virtual page by multiplying the given virtual page's virtual page number by the size of the page table entry. Again, if beginning point 617 is not at page 0, the same result may be reached by doing the multiplication and adding the result to the virtual address of beginning point 617. The same kinds of address calculations may be used to located nodes in level 2 611, except that the beginning point here is the virtual address of node 605(0). If level 1 609, level 2 611, and level 3 613 are mapped as shown in FIG. 6, the entire three-level tree 601 may be mapped into only 64M of virtual memory, and only that amount need be reserved.

Of course three-level tree 601 may be linearly mapped without being self-recursive. In such a mapping, all that is required is that at least the leaf nodes are linearly mapped into a contiguous portion of virtual address space 101. Further, the nodes of the other levels may be linearly mapped into different contiguous portions of virtual address space 101. Such a mapping would be necessary in situations where the size of the entries in the leaf nodes was different from the size of the entries in the nodes in the other levels. Finally, only the root node may be self-recursively mapped into the first node of the second level.

Figure 7:
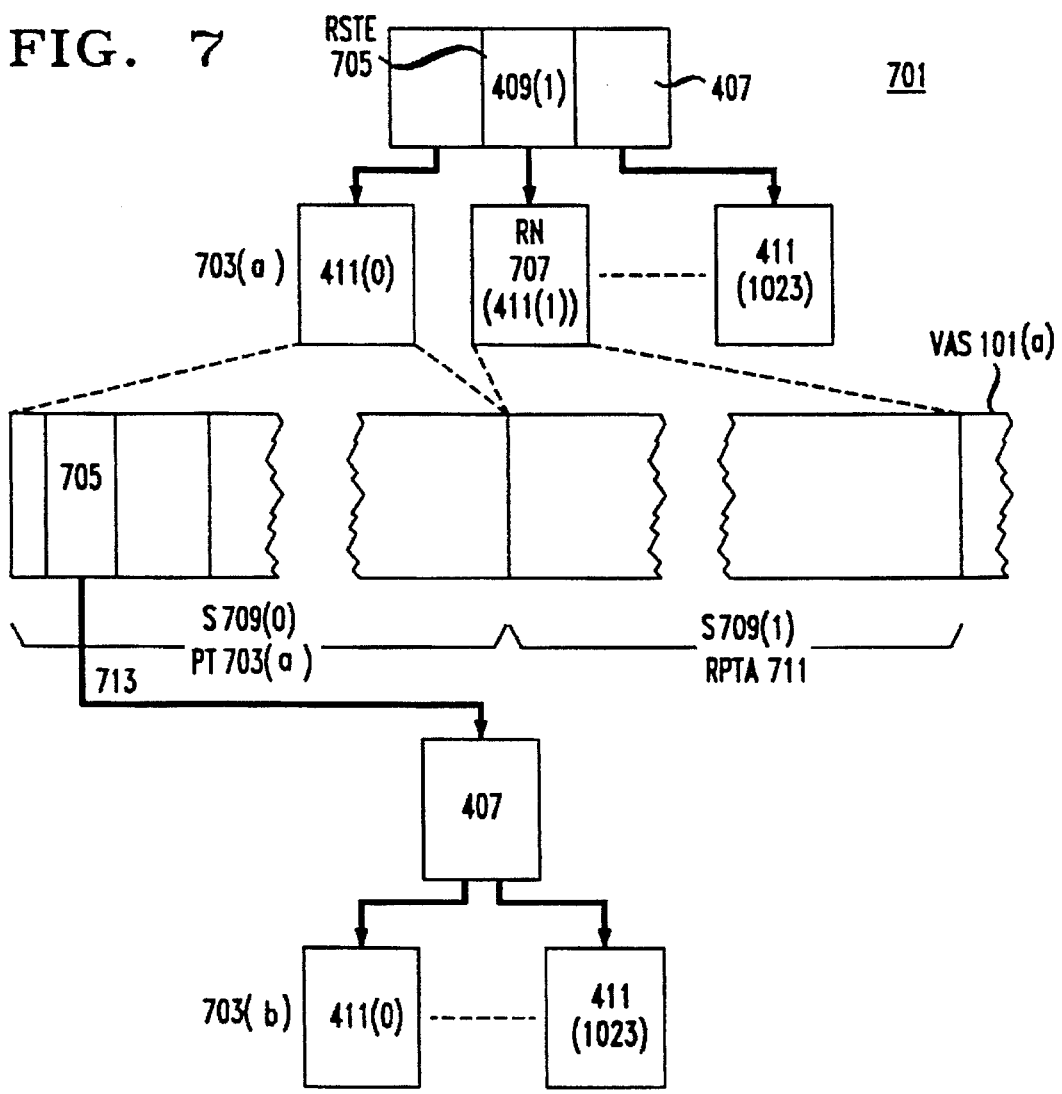
FIG. 7 is a diagram of an arrangement permitting access of a page table tree belonging to a second process from a page tree belonging to a first process.

Management of Related Page Tables: FIG. 7

A further advantage of the mapping techniques disclosed herein is that they simplify virtual memory manager 319's management of multiple virtual address spaces 101. While each process 107 has its own virtual address space 101, more than 1 process 107 may share data store pages 219 and physical pages 215. For example, in the UNIX® operating system, new processes are created by means of the "fork" system call. The new process 107 receives its own virtual address space 101 and a copy of data from the process which executed the code containing the "fork" system call. Some of the data, for example, the program, is read only, and the UNIX operating system maps the disk storage page 219 containing the program and the physical page 215 to which disk storage page 219 has been copied into the virtual address spaces of both processes 107. Consequently, any change in the status of physical page 215 will affect the page table entries for the corresponding virtual pages in both processes 107 and virtual memory manager 319 must correspondingly be able to locate the page tables for the two processes.

Figure 1:
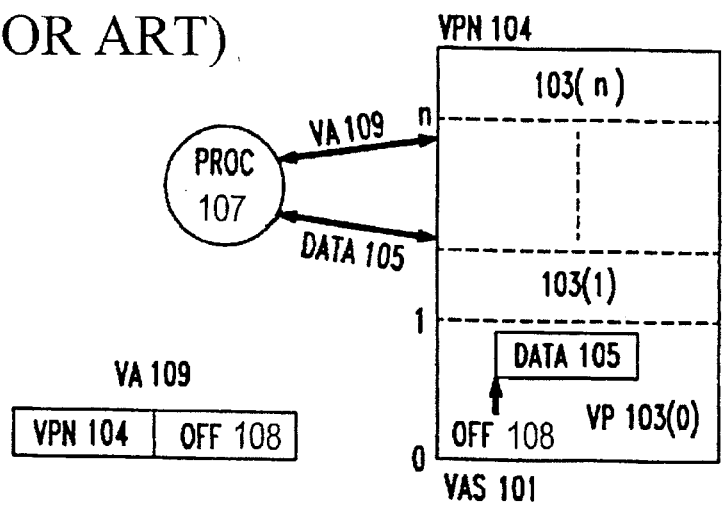
FIG. 1 is a diagram of a virtual address space of the prior art.
Figure 2:
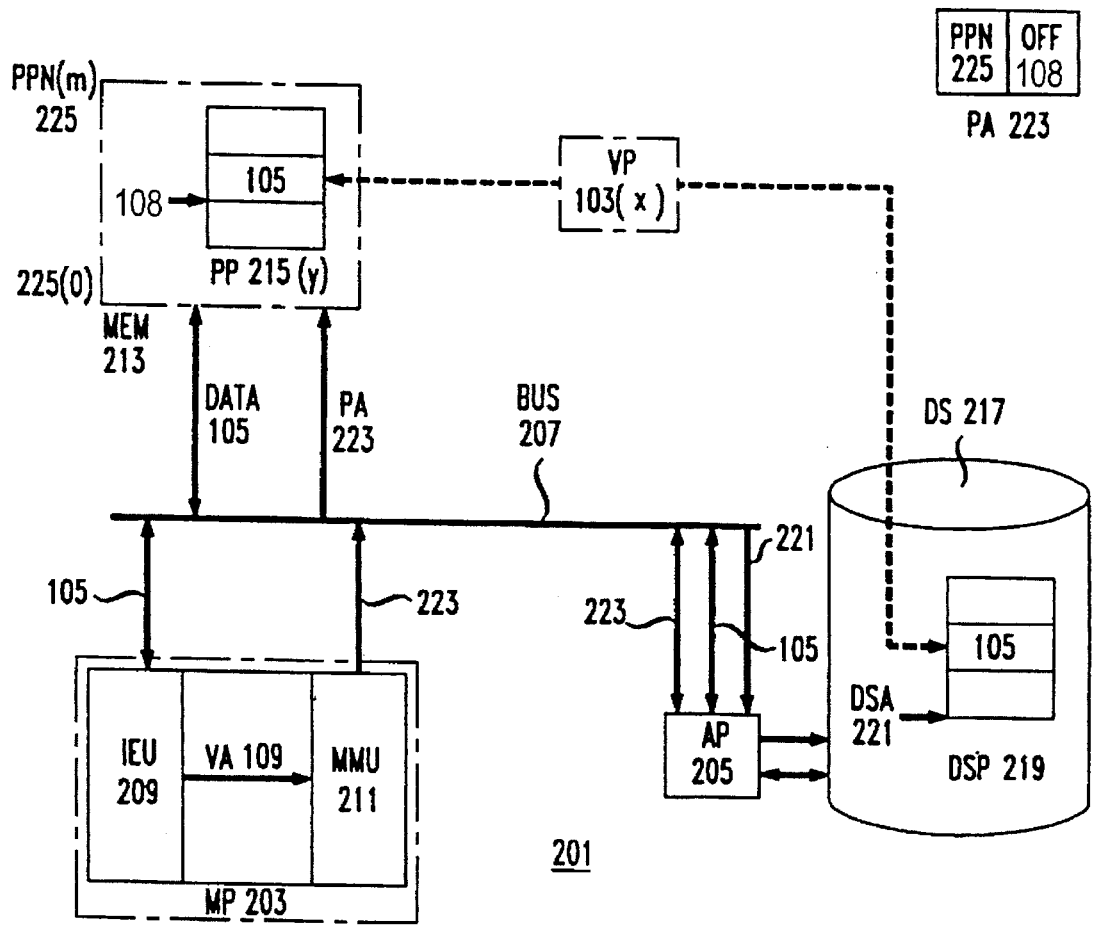
FIG. 2 is a block diagram of a hardware system in which one or more virtual address spaces have been implemented in the prior art.

FIG. 7 shows a technique 701 which permits virtual memory manager 319 to treat a page table tree for another process 107(*b*) as if it were part of the page table tree for a currently active process 107(*a*), where processes 107(*a*) and 107(*b*) are exemplars of the process 107 shown in FIG. 1. In FIG. 7, the hardware system requires a two-level page table tree 701; page table tree 703(*a*) is the page table tree; for the currently-active process 107(*a*); page table tree 703(*b*) is the page table tree for another process 107(*b*); both page table trees 703 have the same overall structure. Page table tree 703 differs in one respect from page table tree 405: leaf node 411(1) is reserved, i.e., the virtual pages 103 specified by reserved node 707 are reserved so that page table tree 703(*b*) can be mapped onto them. Because leaf node 411(1) is reserved, segment table entry 409(1) for leaf node 411(1) does not contain the physical address of a physical page 215 for leaf node 411(1).

Each leaf node 411 in page table tree 703 contains page table entries 413 for 1024 contiguous virtual pages 103; these contiguous virtual pages are termed a segment 709 of virtual address space 101. Thus, leaf node 411(0) contains entries for segment 709(0), leaf node 411(1) entries for segment 709(1), and so forth. Further, as already pointed out in the discussion of mapping 501, exactly 1024 contiguous virtual pages, or 1 segment, are required to map a page table tree 701 onto virtual address space 101. Consequently, the reservation of reserved node 707 in page table tree 703(*a*) means that segment 709(1) is available to have page table tree 703(*b*) mapped into it, and thus functions as reserved page table area 711. When that has been done, page table tree 703(*b*) will be accessible by virtual memory manager 319 when it is executing in virtual address space 101(*a*) for process 107(*a*).

When virtual memory manager 319 is operating in virtual address space 101(*a*) of process 107(*a*) and needs to access process 107(*b*)'s page table nee 703(*b*), it can do so by obtaining the address 713 of physical page 215 containing segment table node 407 of page table tree 703(*b*) and placing address 713 in reserved segment table entry 705. Virtual memory manager 319 can obtain address 713 of physical page 215 from a table managed by the operating system which contains the address of physical page 215 for segment table node 407 for every process which is currently executing a program on the hardware system.

The effect of placing address 709 in reserved segment table entry 707 is to map page table 703(b) onto segment 709(1) in exactly the same fashion that placing the address of the physical page 215 containing segment table node 407 of page table tree 703(a) maps page table tree 703(a) onto segment 709(0). Virtual memory manager 319 can now access page table entries 413 in page table tree 703(b) in exactly the same fashion in which it accesses page table entries 413 in segment 709; the only difference is that the virtual addresses computed from the page table entry size and the virtual page number must be added to the virtual address of the beginning of segment 709(1).

Figure 8:
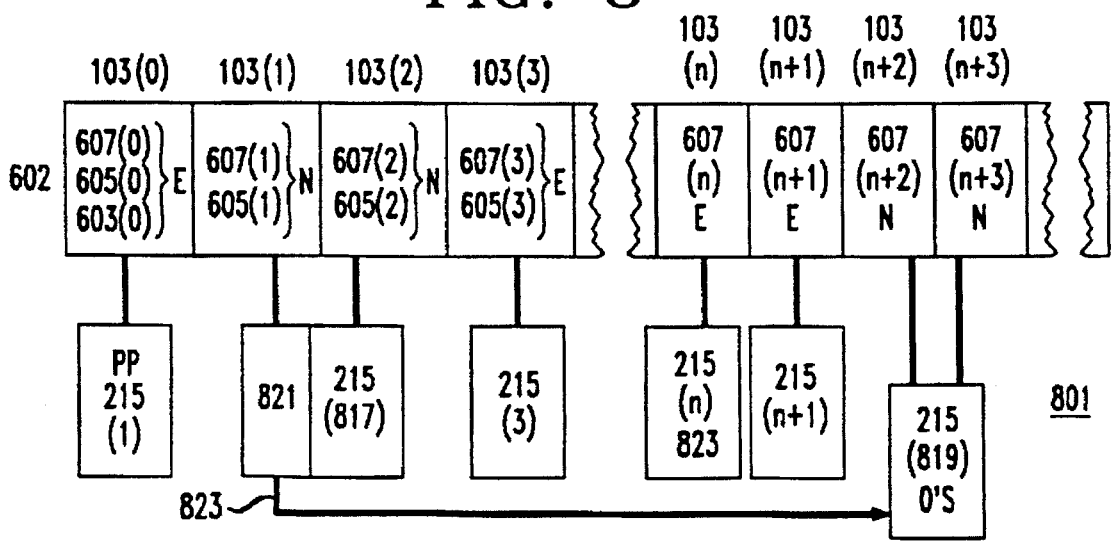
FIG. 8 is a diagram of an arrangement permitting creation of a page table tree on demand.

Constructing Page Table Trees on Demand: FIG. 8

The foregoing discussion has presumed that the page table trees in mappings 501 and 602 were fully loaded, i.e., that there was a page table entry for each virtual page 103 in virtual address space 101. Many processes 107, however, execute programs which provide virtual addresses 104 which access relatively few virtual pages 103. For this reason, virtual memory manager 319 often constructs page table trees "on demand", that is, whenever a virtual address 109 is translated which specifies a virtual page number 104 for which there is presently no leaf node in the page tree, virtual memory manager 319 adds the leaf node and any nodes at higher levels required to reach the leaf node.

Construction of page table trees "on demand" is straightforward when virtual memory manager 319 "walks" the page table tree, i.e., begins at the first level node and then follows the pointers to the second and any lower levels. In that situation, virtual memory manager 319 will find a null pointer in the node at the lower level when the node at the next level does not exist. However, when a page table tree has been mapped into a process 107's virtual address space 101 as described and virtual memory manager 319 first computes the virtual address of an entry in a node of the tree as previously described and then attempts to access the entry, the result will be a page fault if there is as yet no node for the entry in the page table tree. Since a process 107 cannot execute further until the page fault has been handled by virtual memory manager code 319 executing in another process 107, such page faults can greatly slow down virtual memory manager 319's maintenance of the page table tree.

FIG. 8 shows a solution to the page fault problem which is employed in a preferred embodiment. Here, 801 shows how the virtual pages 103 of mapping 602 are mapped into physical pages 215 at a point before the three-level page table tree 601 of mapping 602 is fully loaded. Some of the nodes which are mapped into virtual address space 101 have been created, others have not been. Virtual pages 103 whose nodes have been created appear in FIG. 8 with the letter E; those whose nodes have not been created appear with the letter N. A physical page 215 corresponding to a given virtual page 103 is connected by a line to its corresponding virtual page.

As can be seen in FIG. 8, there is a separate physical page 215 for each virtual page 103 which is occupied by a node which has been created. There is a single physical page 215(819) for each virtual page 103 which is occupied only by a leaf node which has not yet been created. That physical page 215(819) is a read-only physical page whose contents have been set to "0". There is further a single physical page 215(817) for each virtual page 103 which is also occupied by a level 2 node 607 which has not yet been created. All of the entries 821 in physical page 215(817) contain the address of physical page 215(819), as shown by arrow 823. Physical page 215(817) is also a read-only physical page. A single physical page 215(819) and a single physical page 215(817) may be used by the mappings 602 for all of the virtual address spaces 101.

As a result of arrangement 801, a reference by virtual memory manage, 319 to any of the page table entries in leaf nodes 607 which have not yet been created will not result in a page fault. Instead, "0"s will be returned from physical page 215(819) Similarly, a reference by virtual memory manager 319 to any of the entries in level 2 nodes 605 which have not yet been created will result in the return of an entry 821 from physical page 215(817), and that entry 821 will in turn point to virtual page 215(819). Again, no page fault will result from the reference to the level 2 node 605 or to the leaf node represented by entry 821. At the same time, the fact that physical page 215(819) has been set to 0's means that virtual memory manager 319 can detect references to entries in non-existent nodes and add the nodes to the page table tree.

Conclusion

The foregoing Detailed Description has disclosed to one of ordinary skill in the art how page tables required by various kinds of hardware can be mapped into an area of a process's virtual address space such that the mapped area has the same characteristics regardless of the kind of page table and how porting of an operating system to various kinds of hardware systems may be simplified by the use of such mappings. The Detailed Description has further disclosed a number of such mappings, including linear mappings of page table arrays and page table trees of two and more levels. Also disclosed was a self-recursive linear mapping of the page table trees into the virtual address space. Them were further disclosed techniques for making another process's page table tree part of a given process's virtual address space and techniques permitting a linearly-mapped page table tree to be created on demand.

Having perused the Detailed Description and Drawings, those of ordinary skill in the art will easily be able to implement other variations of the concepts disclosed herein. That being the case, the foregoing Detailed Description is to be regarded as being in all respects illustrative and exemplary, and not restrictive, and the scope of the inventions disclosed herein is to be determined solely by the following claims as interpreted in light of the Specification and according to the doctrine of equivalents.

I claim:

1. A method for self-recursively mapping a page table tree into a virtual address space containing virtual pages, the method comprising the steps of:

identifying a segment table node of the page table tree;

identifying a plurality of leaf nodes of the page table tree, each leaf node containing at least one page table entry, each page table entry matching a virtual page number to a corresponding physical page number by containing the physical page number at a location in the page table tree that corresponds to the virtual page number, a plurality of the page table entries functioning simultaneously as pointers to nodes in the page table tree and as addresses of physical pages corresponding to virtual pages; and mapping the leaf nodes into the virtual address space with the page table entries ordered in the virtual address space according to their virtual page numbers.

2. The method of claim 1, further comprising the step of mapping the segment table node into the virtual address space.

3. The method of claim 2, wherein the segment table node and at least one of the leaf nodes are both mapped to the same virtual page.

4. The method of claim 1, wherein the step of mapping the leaf nodes into the virtual address space comprises mapping the leaf nodes into a single contiguous region of the virtual address space.

5. The method of claim 1, further comprising the step of identifying at least one intermediate node between the segment table node of the page table tree and the leaf nodes of the page table tree.

6. The method of claim 5, further comprising the step of mapping the intermediate node into the virtual address space.

7. The method of claim 6, wherein the intermediate node and at least one of the leaf nodes are both mapped to the same virtual page.

8. The method of claim 6, wherein the intermediate node and the segment table node are both mapped to the same virtual page.

9. The method of claim 1, further comprising the steps of:
creating a zeroes page by setting the contents of a physical page of memory to zeroes; and
mapping at least one virtual page to the zeroes page by placing the address of the zeroes page in a page table entry in the page table tree, thereby allowing a virtual memory manager to detect references to missing page table tree nodes without requiring a page fault.

10. The method of claim 9, further comprising the steps of:
identifying at least one intermediate node between the segment table node of the page table tree and the leaf nodes of the page table tree;
creating a pointer page by setting the contents of a physical page of memory to the address of the zeroes page; and
mapping at least one virtual page to the pointer page by placing the address of the pointer page in a page table entry in the page table tree, thereby allowing a virtual memory manager to detect references; to missing page table tree nodes without requiring a page fault.

11. A method for use by a virtual memory manager in managing a first virtual address space and a second virtual address space, the method comprising the steps of:
identifying a first page table tree of a first process corresponding to the first virtual address space;
identifying a second page table tree of a second process corresponding to the second virtual address space; and
mapping the second virtual address space into the first virtual address space by placing the address of a segment node of the second page table tree into a reserved segment table entry in the first page table tree, at least one of the page table trees being self-recursive in that two nodes at different levels of that page table tree are both stored in the same page of memory.

12. The method of claim 11, wherein at least one of the first page table tree and the second page table tree contains an intermediate node located between a segment table node and a leaf node.

13. The method of claim 11, wherein the first page table tree and the second page table tree each contain an intermediate node located between a segment table node and a leaf node.

14. An apparatus for translating a virtual page number portion of a given virtual address into a corresponding physical page number, the apparatus comprising:
a self-recursive page table tree having a segment table node and a plurality of leaf nodes, each leaf node containing at least one page table entry, each page table entry matching a virtual page number to a corresponding physical page number by containing the physical page number at a location in the page table tree that corresponds to the virtual page number;
a memory management unit configured to attempt no read the physical page number from the page table entry which matches the virtual page number, to fail in that attempt when no physical page number presently corresponds to the virtual page number, and to make an additional attempt after the page table entry is updated; and
a virtual memory manager configured to update the page table entry if the memory management unit fails in its attempt to read a physical page number from the page table entry, the virtual memory manager accessing the page table entries by virtual addresses in a virtual address space.

15. The apparatus of claim 14, wherein the page table entries are ordered in the virtual address space according to their virtual page numbers.

16. The apparatus of claim 14, wherein the virtual memory manager accesses both the segment table node and at least one of the leaf nodes using the same virtual page number.

17. The apparatus of claim 14, wherein a single contiguous region of the virtual address space contains the leaf nodes.

18. The apparatus of claim 14, wherein the page table tree further comprises at least one intermediate node between the segment table node and the leaf nodes.

19. The apparatus of claim 18, wherein the virtual memory manager accesses both the intermediate node and the segment table node using the same virtual page number.

20. The apparatus of claim 18, wherein the virtual memory manager accesses both the intermediate node and at least one of the leaf nodes using the same virtual page number.

21. The apparatus of claim 14, wherein the page table tree further comprises a zeroes page table entry which contains the physical page number of a physical page of memory whose contents are zeroes, thereby allowing the virtual memory manager to detect references to missing page table tree nodes without requiring a page fault.

22. The apparatus of claim 21, wherein the page table tree further comprises:
at least one intermediate node between the segment table node of the page table tree and the leaf nodes of the page table tree; and
a pointer page table entry which contains the address of a physical page of memory whose contents are the address of the zeroes page, thereby allowing the virtual memory manager to detect references to missing page table tree nodes without requiring a page fault.

23. An apparatus for translating a virtual page number portion of a given virtual address into a corresponding physical page number, the given virtual address being within the union of a first virtual address space and a second virtual address space, the apparatus comprising:
a first page table tree of a first process corresponding to the first virtual address space;

a second page table tree of a second process corresponding to the second virtual address space, each page table tree having a respective segment table node and a respective plurality of leaf nodes, each leaf node containing at least one page table entry, each page table entry matching a virtual page number to a corresponding physical page number by containing the physical page number at a location in the respective page table tree that corresponds to the virtual page number, at least one of the page table trees being self-recursive, the apparatus further characterized in that a reserved segment table entry in the first page table tree contains the address of the segment node of the second page table tree;

a memory management unit configured to attempt to read the physical page number from the page table entry which matches the virtual page number, to fail in that attempt when no physical page number presently corresponds to the virtual page number, and to make an additional attempt after the page table entry is updated; and a virtual memory manager configured to update the page table entry if the memory management unit fails in its attempt to read a physical page number from the page table entry, the virtual memory manager accessing the page table entries by virtual addresses in a virtual address space.

24. The apparatus of claim 23, wherein at least one of the first page table tree and the second page table tree contains an intermediate node located between a segment table node and a leaf node.

25. The apparatus of claim 23, wherein the first page table tree and the second page table tree each contain an intermediate node located between a segment table node and a leaf node.

* * * * *